United States Patent
Hwangbo

(10) Patent No.: US 8,934,105 B2
(45) Date of Patent: Jan. 13, 2015

(54) IMAGE FORMING APPARATUS AND CONTROL METHOD WITH ERROR DETECTING AND LINE SWITCHING FUNCTION

(75) Inventor: Joon-hyung Hwangbo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1170 days.

(21) Appl. No.: 12/511,228

(22) Filed: Jul. 29, 2009

(65) Prior Publication Data

US 2010/0103443 A1   Apr. 29, 2010

(30) Foreign Application Priority Data

Oct. 27, 2008   (KR) ................. 2008-105523

(51) Int. Cl.
   *G06K 15/22*   (2006.01)
   *H04N 1/00*   (2006.01)
   *H04N 1/32*   (2006.01)

(52) U.S. Cl.
   CPC ....... *H04N 1/32614* (2013.01); *H04N 1/00928* (2013.01); *H04N 1/32635* (2013.01); *H04N 1/32657* (2013.01); *H04N 1/32683* (2013.01); *H04N 1/00347* (2013.01); *H04N 2201/0093* (2013.01)
   USPC ............................ 358/1.13; 358/407; 358/400

(58) Field of Classification Search
   CPC ............ H04N 1/0084; H04N 1/00084; H04N 1/0001; H04N 1/00029; H04M 2203/2066
   USPC ............. 358/1.13, 1.14, 1.15, 1.16, 406, 407, 358/400, 436, 425, 422, 419, 411; 379/100.04, 100.06, 100.08, 100.12, 379/100.14; 375/222
   See application file for complete search history.

(56) References Cited

U.S. PATENT DOCUMENTS

| 5,465,162 A | * | 11/1995 | Nishii et al. | 358/442 |
|---|---|---|---|---|
| 6,307,881 B1 | * | 10/2001 | Noma et al. | 375/222 |
| 6,359,697 B1 | * | 3/2002 | Nagata et al. | 358/1.15 |
| 6,470,098 B2 | * | 10/2002 | Yamaguchi et al. | 382/284 |
| 7,804,888 B2 | * | 9/2010 | Yu | 375/222 |
| 2008/0037417 A1 | * | 2/2008 | Kim et al. | 370/217 |
| 2009/0064170 A1 | * | 3/2009 | Inoue | 718/105 |

FOREIGN PATENT DOCUMENTS

KR   10-2008-0044497   5/2008

OTHER PUBLICATIONS

Korean Office Action mailed Feb. 5, 2013 for corresponding Korean Application No. 10-2008-0105523.

* cited by examiner

*Primary Examiner* — Benny Q Tieu
*Assistant Examiner* — Sunil Chacko
(74) *Attorney, Agent, or Firm* — Staas & Halsey LLP

(57) ABSTRACT

An image forming apparatus and a control method thereof, the control method of an image forming apparatus which transmits and receives facsimiles through a first line and a second line including detecting a facsimile transmitting and receiving error of a first facsimile unit and a second facsimile unit which are respectively matched to the first line and the second line; and switching the first line to be matched to the second facsimile unit if the facsimile transmitting and receiving error is detected in the first facsimile unit. With this, if an error happens to one of a plurality of facsimile cards, a telephone number matched to the facsimile card having the error is automatically switched to a facsimile card normally operating, thereby normally performing a facsimile function.

11 Claims, 4 Drawing Sheets

IMAGE FORMING APPARATUS AND CONTROL METHOD WITH ERROR DETECTING AND LINE SWITCHING FUNCTION

CROSS-REFERENCE TO RELATED APPLICATION

This application claims the benefit of Korean Patent Application No. 10-2008-0105523, filed Oct. 27, 2008, in the Korean Intellectual Property Office, the disclosure of which is incorporated herein by reference.

BACKGROUND OF THE INVENTION

1. Field of the Invention

An apparatus and a method consistent with aspects of the present invention relate to an image forming apparatus and a control method thereof, and more particularly, to an image forming apparatus and a control method thereof having a multi-line facsimile transmitting and receiving function.

2. Description of the Related Art

An image forming apparatus forms an image on a paper. The image forming apparatus may be implemented as a printer, an electronic copier, a facsimile, a multifunction device having more than two functions, etc.

If the image forming apparatus is implemented as a facsimile or a multifunction device having a facsimile function, the image forming apparatus may have a multi-line facsimile transmitting and receiving function.

In general, the image forming apparatus having the multi-line facsimile transmitting and receiving function includes a plurality of lines corresponding to a plurality of telephone numbers, and a plurality of facsimile cards respectively matched to the plurality of lines.

However, in the conventional image forming apparatus having the multi-line facsimile transmitting and receiving function, when an error (i.e., a malfunction) in one of the plurality of facsimile cards occurs, if a user does not manually replace a line matched to the facsimile card having the error, it is impossible to transmit and receive a facsimile to the corresponding telephone number.

If the corresponding telephone number is determined to be a telephone number of a company, etc., and a high number of facsimiles need to be transmitted and received in comparison to other numbers, when the facsimile transmitting and receiving function fail to perform normally, a disruption in facsimile operations occurs.

SUMMARY OF THE INVENTION

Accordingly, aspects of the present invention provide an image forming apparatus and a control method thereof having a multi-line facsimile transmitting and receiving function, and automatically switching a telephone number matched to a facsimile card in which an error happens to a facsimile card normally operating, thereby controlling to normally perform a facsimile function.

Accordingly, another aspect of the present invention provides an image forming apparatus and a control method thereof enabling facsimile transmitting and receiving for a respective telephone number if an error happens to a facsimile card of a first transmitting and receiving of facsimiles, or in other words, a first facsimile operation, matched to the respective telephone number, thereby preventing a disruption in service.

The foregoing and/or other aspects of the present invention provide a control method of an image forming apparatus which transmits and receives facsimiles through a first line and a second line, the control method of the image forming apparatus including detecting a facsimile transmitting and receiving error of a first facsimile unit and a second facsimile unit which are respectively matched to the first line and the second line; and switching the first line to be matched to the second facsimile unit if the facsimile transmitting and receiving error is detected in the first facsimile unit.

According to another aspect of the present invention, the first line may have a first facsimile operation of transmitting and receiving of facsimiles with respect to the second line.

According to another aspect of the present invention, the control method of the image forming apparatus may include: determining whether the first line is in a ready state, and performing the facsimile transmitting and receiving by the second line if the first line is not in the ready state according to a result of the determination.

According to another aspect of the present invention, the detecting the error may be performed according to at least one of an electric power supplying to the first facsimile unit and the second facsimile unit, an error detection period previously defined, and an error detection by a user input.

According to another aspect of the present invention, the control method of the image forming apparatus may include displaying a result of the switching of the first line.

According to another aspect of the present invention, the switching may include switching to the second facsimile unit, according to a user input, if there is the facsimile transmitting and receiving error in the first facsimile unit.

Another aspect of the present invention provides an image forming apparatus transmitting and receiving facsimiles through a first line and a second line, the image forming apparatus including: a first facsimile unit matched to the first line; a second facsimile unit matched to the second line; a switching unit selectively switching the first line and the second line; and a control unit detecting a facsimile transmitting and receiving error of the first facsimile unit and the second facsimile unit, and controlling the switching unit to selectively switch the first line to be matched to the second facsimile unit if there is a facsimile transmitting and receiving error in the first facsimile unit.

According to another aspect of the present invention, the first line may have a first facsimile operation of transmitting and receiving of facsimiles with respect to the second line.

According to another aspect of the present invention, the control unit determines whether the first line is in a ready state, and performs the transmitting and receiving of facsimiles on the second line if the first line is not in the ready state according to a result of the determination.

According to another aspect of the present invention, the control unit performs the error detecting according to at least one of an electric power supplying to the first facsimile unit and the second facsimile unit, an error detection period previously defined, and an error detection by a user input.

According to another aspect of the present invention, the image forming apparatus may include a display unit displaying a switching result.

According to another aspect of the present invention, the image forming apparatus may include a user interface receiving a user selection whether to perform switching to the second facsimile unit if there is a facsimile transmitting and receiving error in the first facsimile unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
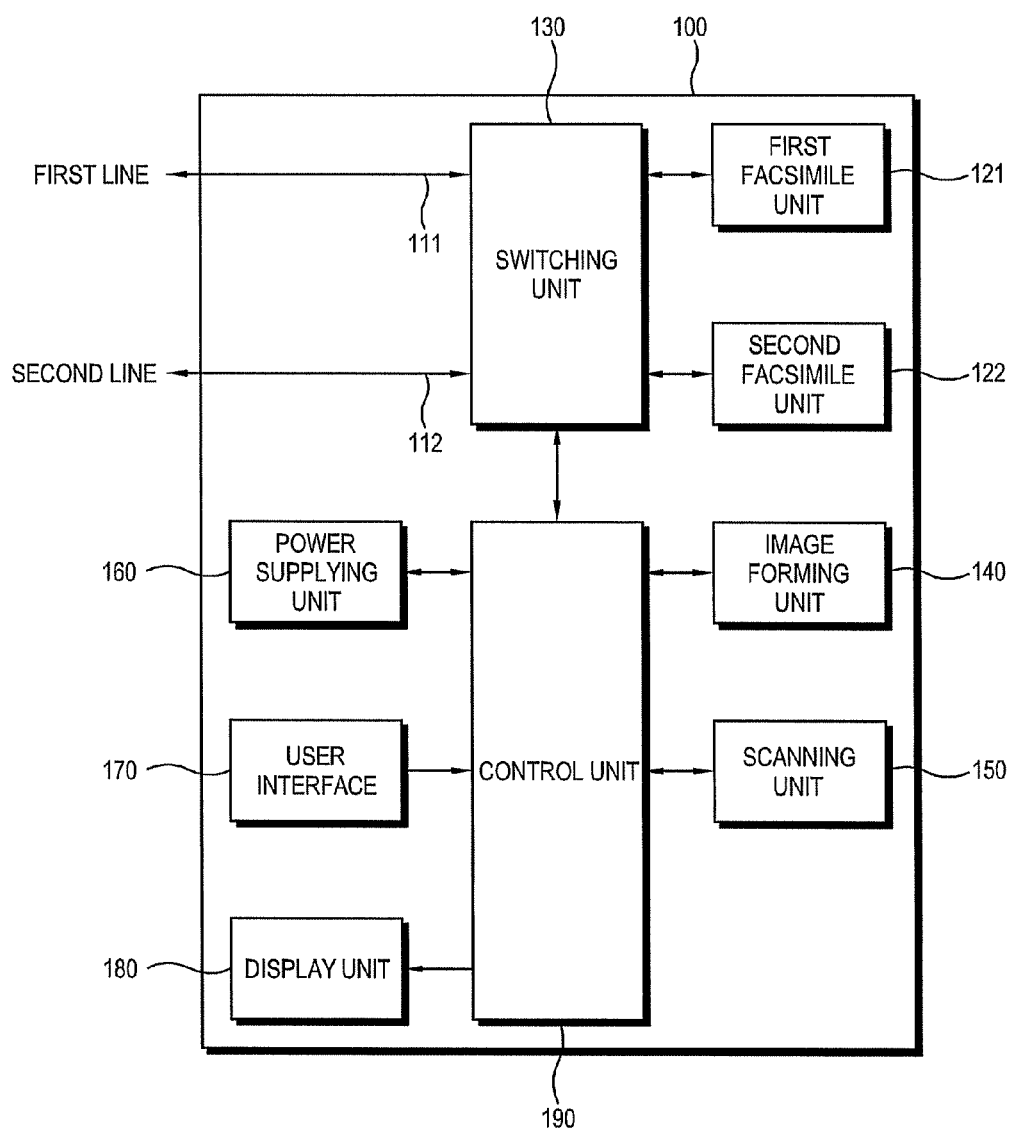
FIG. 1 is a block diagram illustrating an image forming apparatus according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating the configuration of an image forming apparatus 100 according to an exemplary embodiment of the present invention. The image forming apparatus 100 according to the present exemplary embodiment may be implemented as a facsimile, an electronic copier, a multifunction device having a facsimile function, or other similar devices.

The image forming apparatus 100, according to the present exemplary embodiment has a multi-line facsimile transmitting and receiving function performing a facsimile function through at least two lines, and includes a plurality of lines corresponding to a plurality of telephone numbers, and a plurality of facsimile cards respectively matched to the plurality of lines.

As shown in FIG. 1, the image forming apparatus 100 includes a first line 111, a second line 112, a first facsimile unit 121, a second facsimile line 122, a switching unit 130, an image forming unit 140, a scanning unit 150, a power supplying unit 160, a user interface 170, a display unit 180 and a control unit 190.

The image forming apparatus 100 transmits and receives a facsimile by at least one of the first line 111 and the second line 121. The first line 111 and the second line 121 correspond to a plurality of different telephone numbers.

In the present exemplary embodiment, a telephone number corresponding to the first line 111 is exemplarily described to correspond to a respective telephone number. Accordingly, the first line 111 may have a first facsimile operation on the second line 112 in transmitting and receiving a facsimile.

The first facsimile unit 121 and the second facsimile unit 122 are respectively matched to the first line 111 and the second line 112 to perform a facsimile transmitting and receiving. In detail, the first facsimile unit 121 and the second facsimile unit 122 each include a facsimile communication module (a modem (modulator and demodulator) or a facsimile card) changing a data scanned by the scanning unit 150 to a facsimile signal to transmit, or receiving a facsimile signal from an outside source.

In the exemplary embodiment of the present invention as shown in FIG. 1, the image forming apparatus 100 is exemplarily described to include two facsimile units, however, aspects of the present invention are not limited thereto. Aspects of the present invention may be applied to the image forming apparatus 100 including at least three facsimile units. If at least three facsimile units are provided, at least one line may have a first facsimile operation transmitting and receiving a facsimile with respect to other lines.

The switching unit 130 selectively switches the first line 111 and the second line 121 so that a facsimile signal using the first line 111 or the second line 112 can be transmitted and received by one of the first facsimile unit 121 and the second facsimile unit 122.

Figure 2:
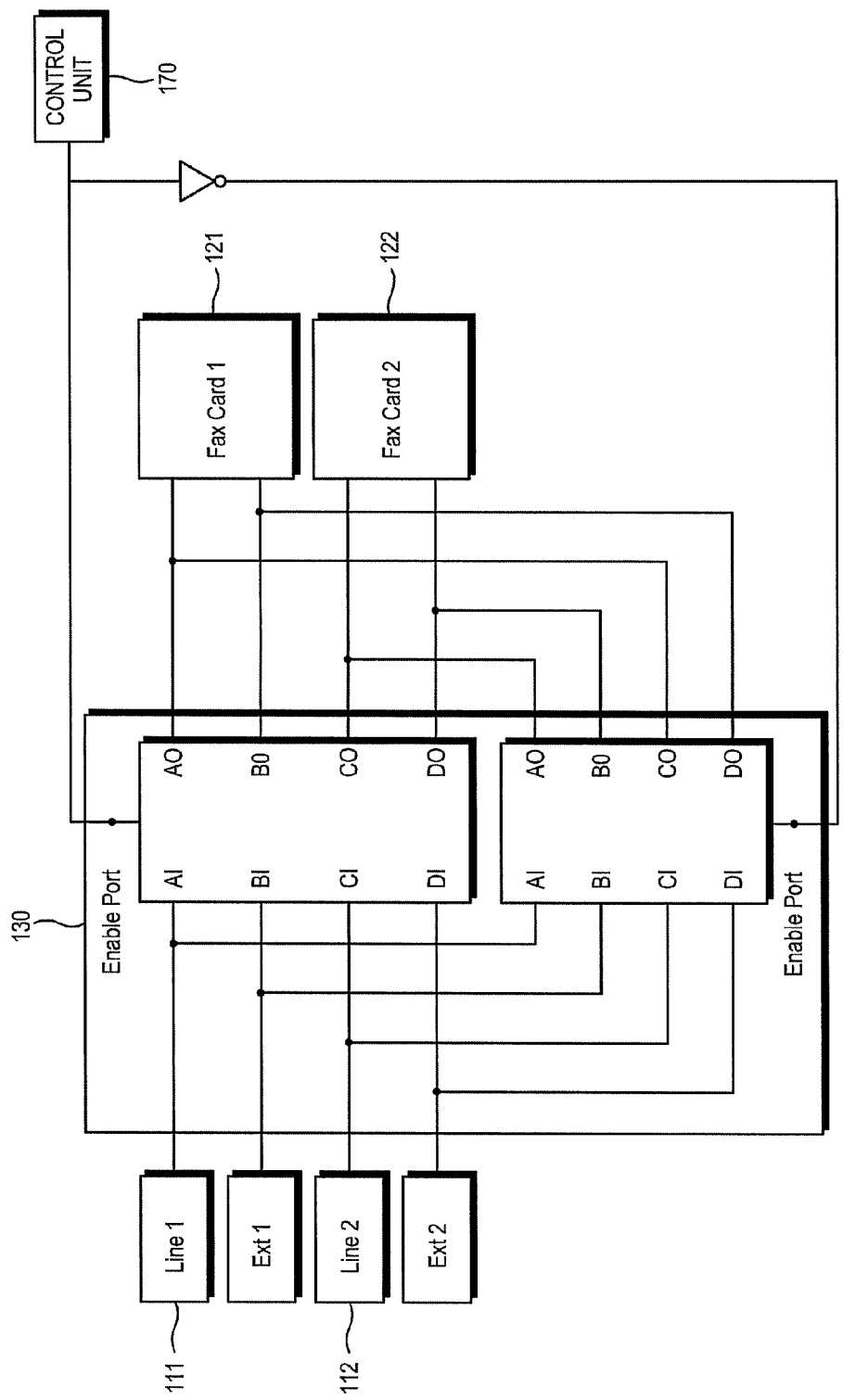
FIG. 2 illustrates a switching unit according to the exemplary embodiment of the present invention as illustrated in FIG. 1.

FIG. 2 illustrates the switching unit 130 according to the exemplary embodiment of the present invention.

The switching unit 130 is interposed between the first line 111 and the second line 112, and the first facsimile unit 121 and the second facsimile unit 122, and the image forming apparatus 100, as illustrated in FIG. 1, is set by an initial setting so that the first line 111 can be matched to the first facsimile unit 121, and the second line 112 can be matched to the second facsimile unit 122 so as to transmit and receive a facsimile signal.

Accordingly, as show in FIG. 2, the switching unit 130 performs switching so that the first line 111 and the second line 112 can be connected with one of the first facsimile unit 121 and the second facsimile unit 122 depending on a control of the control unit 190. The switching unit 130, according to the present exemplary embodiment, may be implemented as a switching circuit switching at least one of the first line 111 and the second line 112 depending on a control of the control unit 190 as shown in FIG. 2.

The image forming unit 140 forms an image printed on at least one paper corresponding to a printing data. Here, the printing includes printing of a facsimiles data, printing for copying after scanning and printing of a printing data received from an outside through a host apparatus or stored in an internal unit (a hard disk drive (HDD), or other similar internal storage units) of the image forming apparatus 100 or an external unit (a universal serial bus (USB) memory, or other similar external storage units).

The scanning unit 150, as illustrated in FIG. 1, reads a scanning target document to generate a scan image. The scanning target document includes a document, a photograph, a film, etc. The scanning unit 150 may scan a target document to generate data, and the data read by the scanning unit 150 is changed to a facsimile signal to be transmitted by the first facsimile unit 121 and the second facsimile unit 122.

The power supplying unit 160, as illustrated in FIG. 1, supplies electric power to the image forming apparatus 100. If an electric power supply from the power supplying unit 160 is sensed, the image forming apparatus 100 performs initialization for the first facsimile unit 121 and the second facsimile unit 122 to determine whether the first facsimile unit 121 and the second facsimile unit 122 will operate without error.

The user interface 170 receives a command from a user. The user interface 170 may include a key button (hereinafter referred to as a 'hard key' or a 'key pad') provided to the image forming apparatus 100, or a graphic user interface (GUI) generated by execution of a printer driver or a separate application to be displayed in the display unit 180 to enable a user to input the command.

If an error or disruption to facsimile operations happens to at least one of the first facsimile unit 121 and the second facsimile unit 122, the user interface 170 of the image forming apparatus 100, according to the present exemplary embodiment, may receive a selection of a user for switching the line matched to the corresponding facsimile unit.

According to another exemplary embodiment of the present invention, a user may receive the selection of a user for the switching of the line through a host apparatus connectable with the image forming apparatus 100 by a network.

The display unit 180 may display setting and operation states of the image forming apparatus 100 to a user, and may display a GUI screen for receiving various commands from the user. The display unit 180 may include a thin film transistor-liquid crystal display (TFT-LCD), and a driving unit (not shown) driving the TFT-LCD.

If an error happens to at least one of the first facsimile unit 121 and the second facsimile unit 122, the display unit 180 may display a GUI screen allowing a user to switch a line matched to the corresponding facsimile unit. Accordingly, if the user switches the line through the user interface 170, the image forming apparatus 100 matches the corresponding line to a facsimile unit normally operating, thereby the image forming apparatus 100 normally performs a facsimile transmitting and receiving.

The control unit 190, as shown in FIG. 1, controls the image forming apparatus 100. In detail, if electric power is supplied to the image forming apparatus 100, the control unit 190 executes initialization resetting software to examine the first facsimile unit 121 and the second facsimile unit 122 in order to determine whether an error (i.e., a malfunction or a disruption in operation) happens to the first facsimile unit 121 and the second facsimile unit 122. Here, the facsimile transmitting and receiving error may include at least one of a hardware failure and a software failure.

According to the result of the examination, if an error on the first facsimile unit 121 has occurred, and that the facsimile transmitting and receiving is disrupted, the control unit 190 controls the switching unit 130 to perform switching so that the first line 111 is matched to the second facsimile unit 122.

Accordingly, since a facsimile signal using the telephone number corresponding to the first line 111 can be transmitted and received by the second facsimile unit 122, the facsimile transmitting and receiving for the respective telephone number having the first facsimile operation can be guaranteed to be performed normally.

In the present exemplary embodiment, if the electric power is supplied to the image forming apparatus 100, the control unit 190 performs the initialization with respect to the modem to determine whether to normally operate, and performs the switching based on the determination result. Alternatively, the control unit 190 may determine whether an error happens to the facsimile transmitting and receiving according to either an error detecting period previously defined or an error detecting by a user input irrespective of the electric power supplying, or both the error detecting period and the user input, and the control unit 190 may perform the switching if the error is detected. Here, the error detecting period previously defined may be determined as at least one of a day, a week, a month and a year. Also, the error detection by the user input may be implemented by clicking a test button provided to a panel provided as an input device of the image forming apparatus 100, or inputting through a host apparatus connectable with the image forming apparatus 100. Alternatively, the control unit 190 may determine whether an error happens to the facsimile transmitting and receiving according to all of or a combination of the electric power being supplied to the image forming apparatus, the error detecting period and the user input.

The image forming apparatus 100, according to the present exemplary embodiment, may perform the facsimile transmitting and receiving through the second line 112 when the first line 111 having the first facsimile operation is not engaged. In detail, the control unit 190 determines whether the first line 111 is in a ready state, and may perform the facsimile transmitting and receiving on the second line 112 if the first line 111 is not engaged according to the determination result. Similarly, the image forming apparatus 100, according to the present exemplary embodiment, may perform the facsimile transmitting and receiving through the second line 112 after other facsimile jobs on the first line 111 are to be performed when the first line 111 is in a busy state performing the facsimile transmitting and receiving.

Hereinafter, a control method of the image forming apparatus 100 having the configuration as described above will be described with reference to FIGS. 3A and 3B.

Figure 3A:
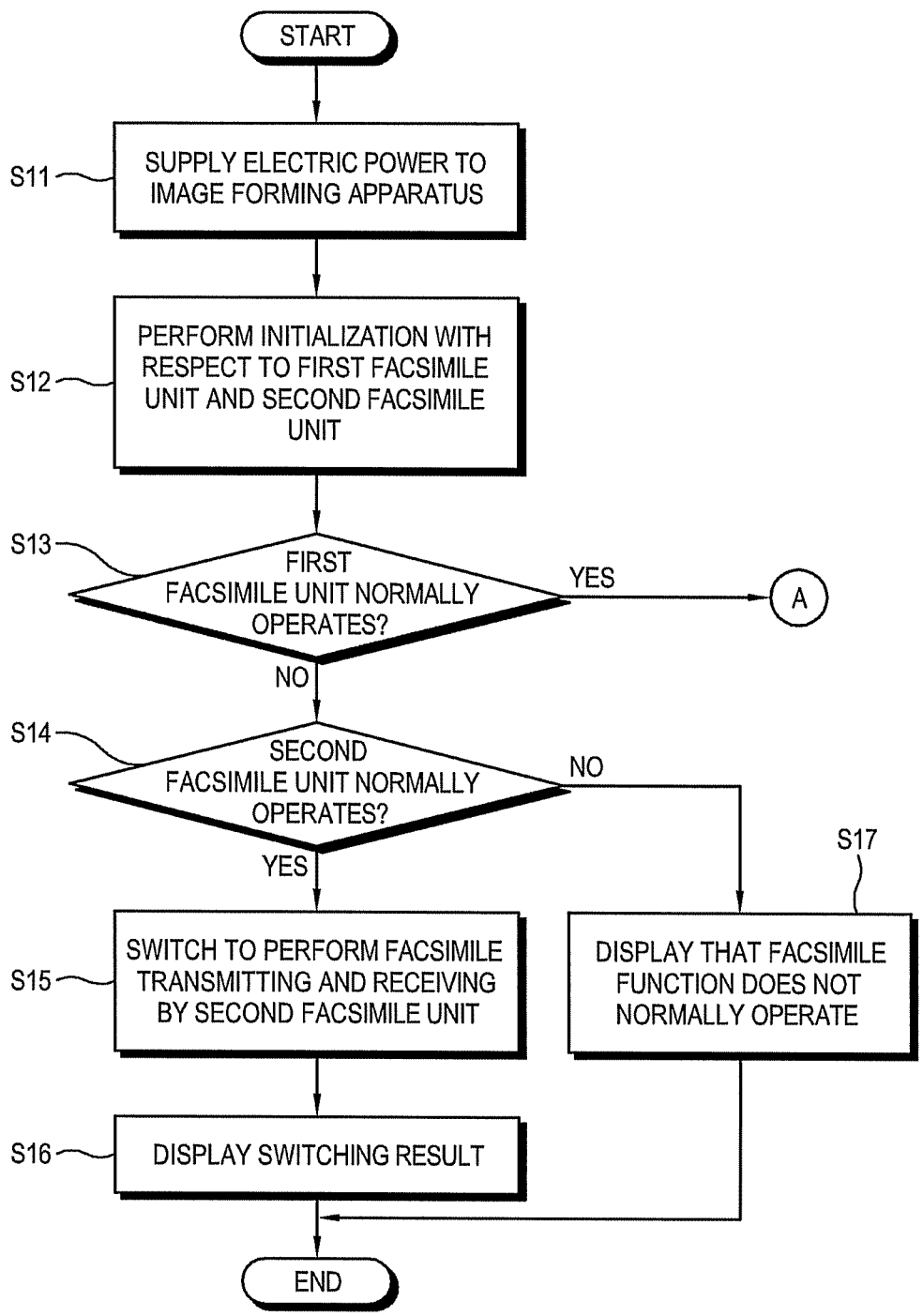
FIGS. 3A and 3B are flowcharts illustrating a control method of an image forming apparatus according to an exemplary embodiment of the present invention.

As shown in FIG. 3A, the image forming apparatus 100 is supplied with an electric power through the power supplying unit 160 (S11).

If the electric power is supplied to the image forming apparatus 100 in the operation S11, the control unit 190 performs initialization with respect to the first facsimile unit 121 and the second facsimile unit 122 (S12).

According to the performing of the initialization in the operation S12, the control unit 190 determines whether the first facsimile unit 121 matched to the first line 111 having a first facsimile operation operates normally. That is, the control unit 190 detects whether a facsimile transmitting and receiving error occurs in the first facsimile unit 121 (S13).

According to the error detecting operation S14, if an error is detected on the first facsimile unit 121 in operation S13, the control unit 190 determines whether the second facsimile unit 122 matched to the second line 112 having a second facsimile operation operates normally. That is, the control unit 190 detects a facsimile transmitting and receiving error in the second facsimile unit 122 (S14). The facsimile transmitting and receiving error may include at least one of a hardware failure and a software failure.

If the second facsimile unit 122 is determined to normally operate in the detecting result of the operation S14, the control unit 190 controls the switching unit 130 to perform switching which enables a facsimile signal using the first line 111 to be transmitted and received by the second facsimile unit 122 (S15). Accordingly, the facsimile of the first line 111 having a respective telephone number can normally operate through the second facsimile unit 122, thereby guaranteeing the first facsimile operation.

The image forming apparatus 100 may detect a facsimile transmitting and receiving error in the operation S12 according to at least one of an error detection period previously defined, an error detection by a user input, or the case that the electric power is supplied to the image forming apparatus 100, or a combination thereof.

In the operation S14, the image forming apparatus 100 may display on the display unit 180 whether an error happens to the first facsimile unit 121 through the user interface 170. Then, the image forming apparatus 100 may receive a user selection through the user interface 170 to switch the first line 111. Here, the receiving the selection of the switching may be performed through a local user interface (LUI) provided to the image forming apparatus 100, or a remote user interface (RUI) displayed to an external apparatus (not shown) such as a host apparatus connectable from an outside through a network.

Then, the control unit 190 controls the display unit 180 to display to the user the switching operation S15 (S16).

If an error is determined to happen to the second facsimile unit 122 in the operation S14, the control unit 190 controls the display unit 180 to display to the user that the facsimile function of the image forming apparatus 100 does not normally operate (S17).

Figure 3B:
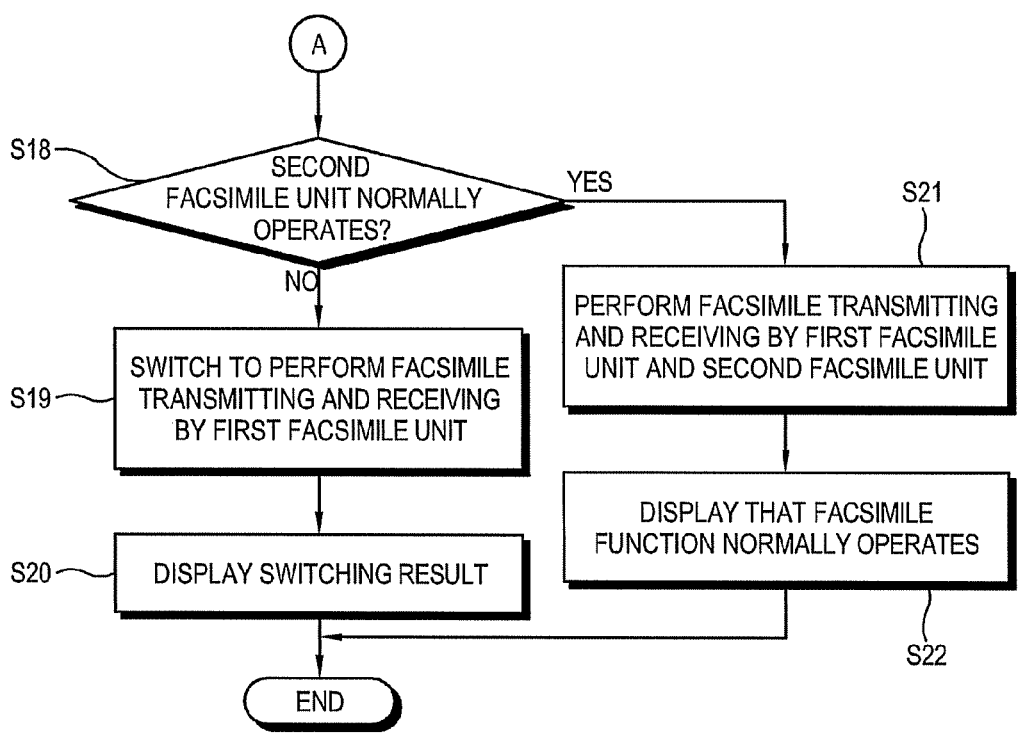

Referring to FIG. 3B, in the operation S13, if the first facsimile unit 121 is determined to be not operating normally, the control unit 190 determines whether the second facsimile unit 122 matched to the second line 112 of having a second facsimile operation executes a facsimile transmitting and receiving. That is, the control unit 190 determines whether the second facsimile unit 122 normally operates (S18).

If an error is determined to happen to the second facsimile unit 122 in the operation S18, the control unit 190 controls the switching unit 130 to perform switching which enables a facsimile signal using the second line 112 to be transmitted and received by the first facsimile unit 121 (S19). Accordingly, although an error happens to one of the first facsimile unit 121 and the second facsimile unit 122, the image forming apparatus 100 can normally perform the facsimile transmitting and receiving.

Then, the control unit 190 controls the display unit 180 to display the switching result of the operation S19 to the user (S20).

If the second facsimile unit 122 is determined to normally operate in the operation S18, the control unit 190 controls the first line 111 and the second line 112 to perform a facsimile transmitting and receiving by the first facsimile unit 121 and the second facsimile unit 122 respectively matched corresponding to the initial setting (S21).

Also, the control unit 190 may control the display unit 180 to display that the facsimile function normally operates (S22).

The determining processes of the operations S13, S14 and S18 may be repeatedly performed according to the number of a facsimile card provided to the image forming apparatus 100 or a prior order of a line, and the determining order may be changed.

Also, irrespective of the case that an electric power is supplied to the image forming apparatus 100, if the control unit 190 determines that an error occurs as per a facsimile transmitting and receiving, the control unit 190 may be configured to perform the switching automatically, or to display the error happening to allow a user to select the switching.

According to the present exemplary embodiment, if an error happens to one of a plurality of facsimile cards, the image forming apparatus 100 automatically switches a telephone number matched to a facsimile card to a facsimile card that is operating normally in order to perform the facsimile operation, and preferentially determines a facsimile transmitting and receiving of a line of a first facsimile operation, thereby guaranteeing the line of the first facsimile operation.

As described above, in the image forming apparatus and the control method thereof having the multi-line facsimile transmitting and receiving function according to the present invention, if an error happens to one of a plurality of facsimile cards, a telephone number matched to the facsimile card having the error is automatically switched to a facsimile card operating normally, thereby performing a facsimile function.

Also, if an error happens to a facsimile card of a first facsimile operation matched to a respective telephone number, a facsimile is capable of being transmitted and received through the another telephone number, thereby overcoming a disruption in service.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A control method of an image forming apparatus which transmits and receives facsimiles through a first line and a second line, the control method of the image forming apparatus comprising:
   detecting an error in a first facsimile unit, which is matched to the first line having a first telephone number through a switching unit, and a second facsimile unit, which is matched to the second line having a different second telephone number through the switching unit, with respect to a facsimile transmitting and receiving operation; and
   switching the first line and the first telephone number with the switching unit to be matched to the second facsimile unit, instead of the second telephone number, if an error is detected in the first facsimile unit,
   wherein the first line has a first facsimile operation of transmitting and receiving of facsimiles with respect to the second line.

2. The control method of the image forming apparatus according to claim 1, further comprising:
   determining whether the first line is in a ready state, and performing the facsimile transmitting and receiving on the second line if the first line is in the ready state according to a result of the determination.

3. The control method of the image forming apparatus according to claim 1, wherein an examination is performed according to at least one of an electric power supplying to the first facsimile unit and the second facsimile unit, an error detection period previously defined, and an error detection by a user input.

4. The control method of the image forming apparatus according to claim 1, further comprising displaying a result of the switching of the first line.

5. The control method of the image forming apparatus according to claim 1, wherein the switching comprises:
   switching to the second facsimile unit, according to a user input, if there is the facsimile transmitting and receiving error in the first facsimile unit.

6. The control method of the image forming apparatus according to claim 1, further comprising:
   switching the second line to be matched to the first facsimile unit if the facsimile transmitting and receiving error of the second facsimile unit is detected.

7. An image forming apparatus which transmits and receives facsimiles through a first line and a second line, the image forming apparatus comprising:
   a first facsimile unit matched to the first line having a first telephone number;
   a second facsimile unit matched to the second line having a different second telephone number;
   a switching unit interposed between the first and second lines and the first and second facsimile units and capable of selectively switching the first line and the second line between the first facsimile unit and the second facsimile unit; and
   a control unit capable of detecting an error in the first facsimile unit and the second facsimile unit with respect to a facsimile transmitting and receiving operation, and controlling the switching unit to switch the first line and the first telephone number to be matched to the second facsimile unit, instead of the second telephone number, if an error is detected in the first facsimile unit, wherein the first line has a first facsimile operation of transmitting and receiving of facsimiles with respect to the second line.

8. The image forming apparatus according to claim 7, wherein the control unit determines whether the first line is in a ready state, and performs the transmitting and receiving of facsimiles on the second line if the first line is in the ready state according to a result of the determination.

9. The image forming apparatus according to claim 7, wherein the control unit performs thean examination according to at least one of an electric power supplying to the first facsimile unit and the second facsimile unit, an error detection period previously defined, and an error detection by a user input.

10. The image forming apparatus according to claim 7, further comprising a display unit displaying a switching result.

11. The image forming apparatus according to claim 7, further comprising a user interface receiving a user selection whether to perform switching to the second facsimile unit if there is a facsimile transmitting and receiving error in the first facsimile unit.

\* \* \* \* \*

UNITED STATES PATENT AND TRADEMARK OFFICE
CERTIFICATE OF CORRECTION

Page 1 of 1

PATENT NO.         : 8,934,105 B2
APPLICATION NO.    : 12/511228
DATED              : January 13, 2015
INVENTOR(S)        : Hwangbo It is certified that error appears in the above-identified patent and that said Letters Patent is hereby corrected as shown below:

In the Claims

Claim 9, column 9, line 10, delete "thean" and insert -- an --, therefor.

Signed and Sealed this
Thirtieth Day of June, 2015

Michelle K. Lee
*Director of the United States Patent and Trademark Office*